May 15, 1945.  W. J. RANDALL  2,376,185
CLOSURE OF COLLAPSIBLE CONTAINERS
Filed Sept. 9, 1942  9 Sheets-Sheet 6
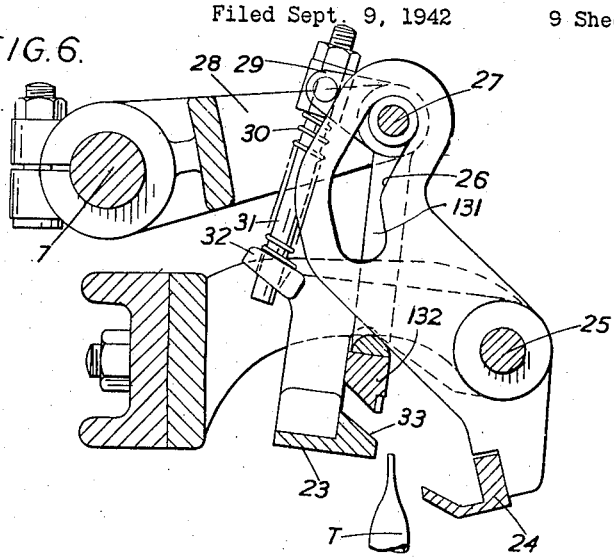
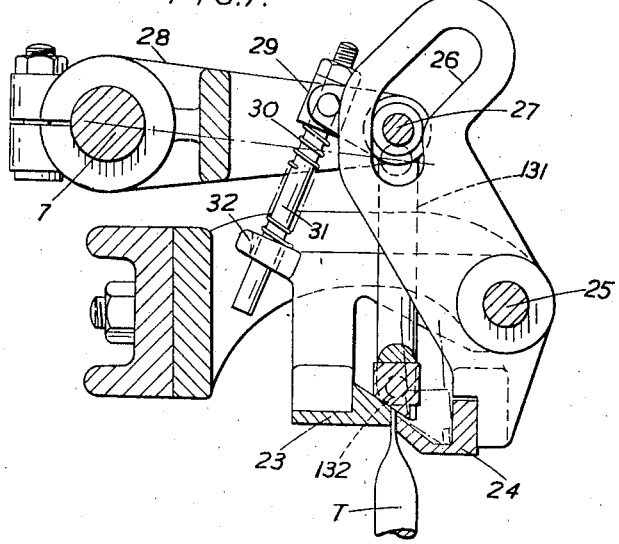
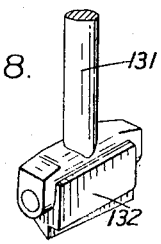
INVENTOR
William Joseph Randall
BY
Ralph B. Stewart
ATTORNEY May 15, 1945. W. J. RANDALL 2,376,185
CLOSURE OF COLLAPSIBLE CONTAINERS
Filed Sept. 9, 1942 9 Sheets-Sheet 7

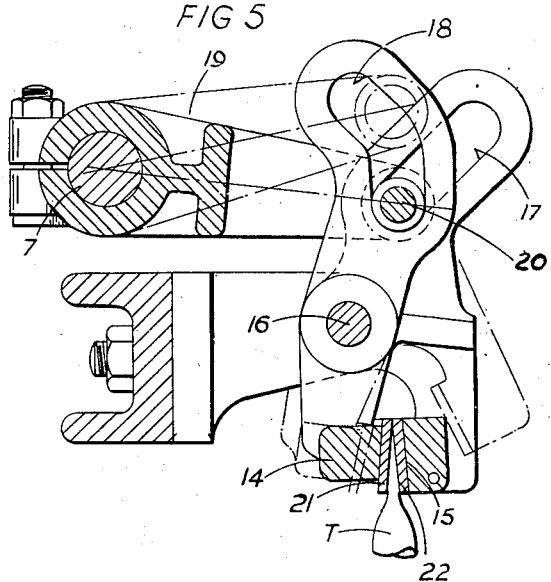
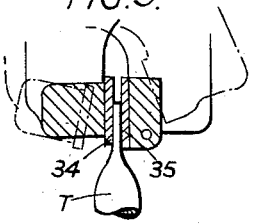
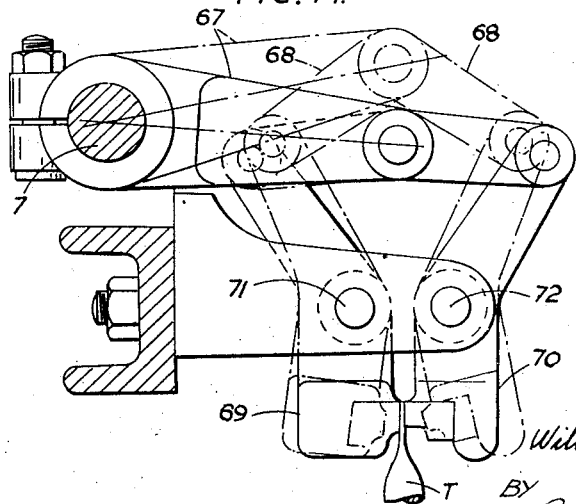

INVENTOR
William Joseph Randell
BY
Ralph B. Stewart
ATTORNEY

May 15, 1945.  W. J. RANDALL  2,376,185
CLOSURE OF COLLAPSIBLE CONTAINERS
Filed Sept. 9, 1942  9 Sheets-Sheet 8
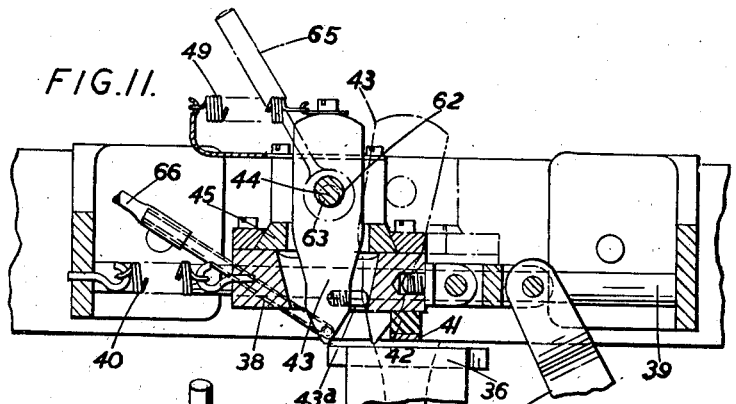
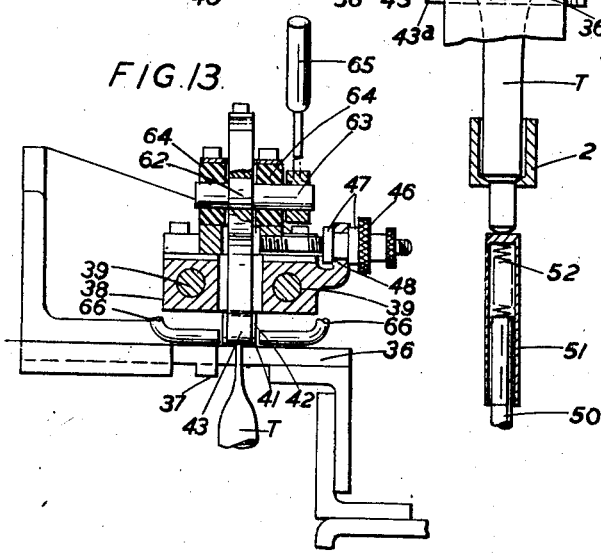
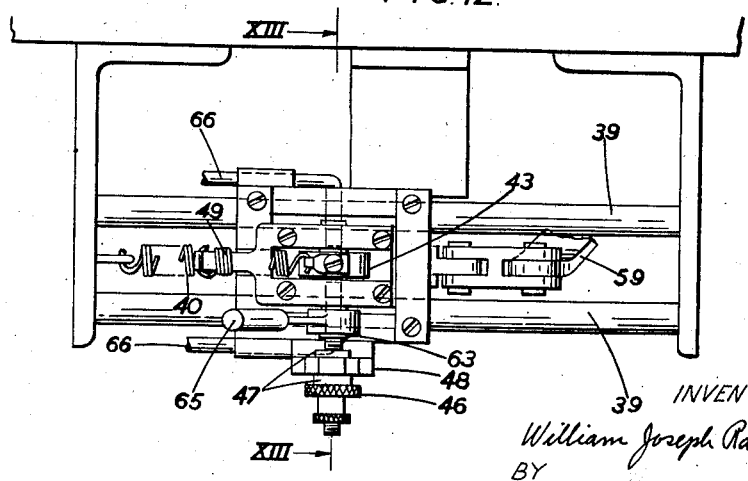
INVENTOR
William Joseph Randall
BY
Ralph B. Stewart
ATTORNEY

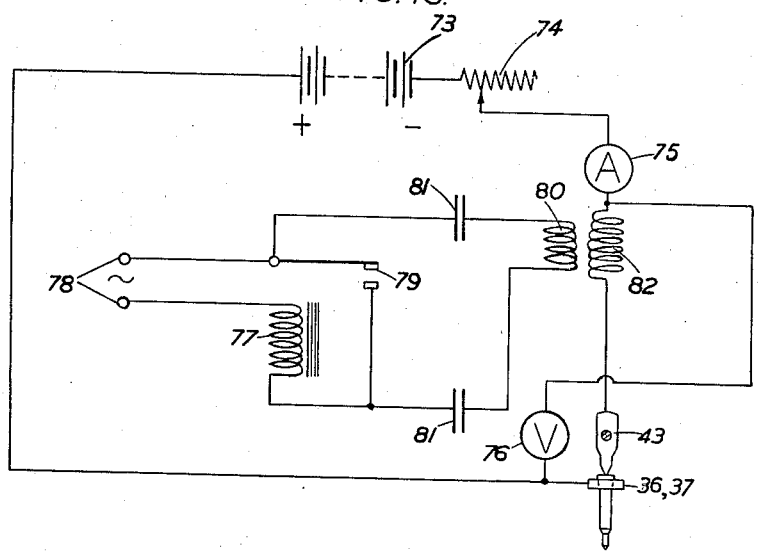
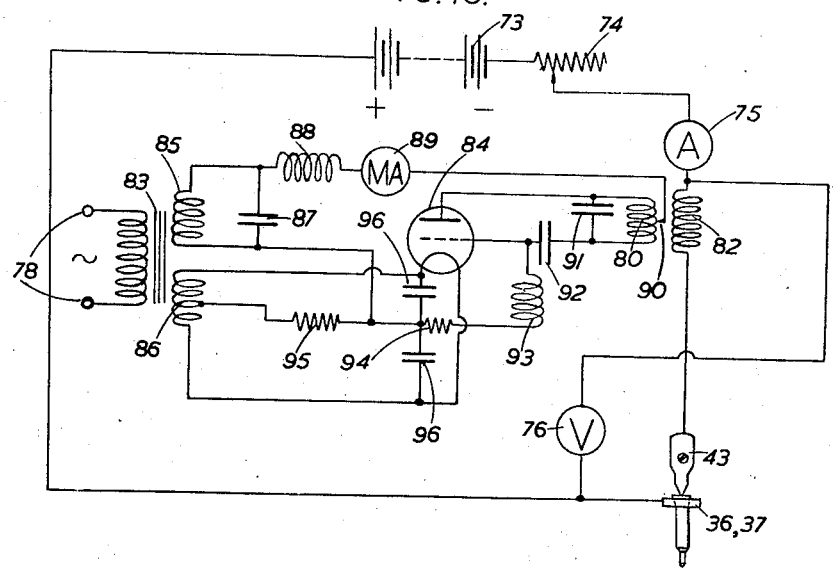

Patented May 15, 1945

2,376,185

UNITED STATES PATENT OFFICE 2,376,185

CLOSURE OF COLLAPSIBLE CONTAINERS

William Joseph Randall, Lenton, England

Application September 9, 1942, Serial No. 457,762
In Great Britain November 4, 1941

14 Claims. (Cl. 219—8)

This invention relates to methods of sealing or closing collapsible metal containers for holding pasty or liquid materials so as to prevent any leakage of the contents. The invention is applicable to collapsible metal tubes of the kind which are closed by collapsing the wall or walls at or adjacent to one or both ends of the tube. Such collapsible metal tubes are frequently used for tooth pastes, shaving creams, liquids, jellies and so forth, and the collapsed ends are usually folded and crimped or clipped to form a seal.

Such containers are usually filled at one end whilst the tube is still in the circular form with the open end of the same diameter as that of the tube. The closure is effected by squeezing together the open end of the tube for a short distance from such end of the tube and then folding over the end on itself two or more times, squeezing the folded-over portion between flat jaws if a plain closure is to be effected, or between suitably serrated jaws if a crimped closure is to be effected. A plain closure may be left as made, or a metal clip consisting of a strip of metal of U-section may be applied to the closure, and then closed up tight in order to compress and hold the closure.

It has been found that the closure so effected is not usually airtight or liquid-tight, and in the case of liquids or preparations of a paste-like nature which have a tendency after filling into the tubes to form a liquid phase by separation especially in hot climates, oozing of liquid from the clipped or folded closure often occurs and produces an unsightly appearance by staining or discolouring the tube, or the carton in which it may be packed after filling, or both.

Various proposals have been made to avoid this defect and in particular, in the specification of our British Patent No. 500,491, the application of chlorinated rubber varnish to the walls of the tube prior to sealing is proposed. Whilst this is effective in most cases, certain solvents such as esters and cyclic hydrocarbons tend to dissolve or swell the chlorinated rubber and leakage may occur. It has since been found that the most effective form of closure is a closure which is effected by fusion welding, by which, after flattening, the end walls of the tube are fused or melted together to form a homogeneous seal being identical to and having the same properties as the wall material.

However, various methods for effecting such a seal by welding have been previously proposed, but in commercial practice there are various difficulties associated with some of such previous methods of effecting a closure; in particular, when using electrically heated copper bits for melting down the end of the tube, it is necessary to maintain the copper bit at such a temperature that it speedily becomes burnt and ineffective and its use in a continuously operating machine becomes impracticable. The quality of the weld effected also deteriorates rapidly after the first few welds and many tubes fail through leakage at the corners. A method of operation already suggested by using a carbon disc electrode mounted at an angle to the joint to be made and so as to turn to present a fresh surface at each welding stroke, is more practical and produces satisfactory results when welding collapsible tubes made of pure tin. It has been found, however, when using such an arrangement, that it is not possible successfully to weld collapsible tubes made of lead. Even in the case of collapsible tubes made of tin, the arrangement proposed for rotating the electrode in order to provide continuous operation, is highly complicated and the maintenance of the correct height of the tubes after shearing the ends, relying entirely on the grip of tube-carrying cups, makes it difficult to apply such an arrangement to tube-filling machines of the type provided with vertical folding and crimping jaws operated from overhead, by modifying such jaws so that the tube is cut to a constant length and the end suitably flattened. In such a case, there is a tendency for the collapsible tubes to lift in the tube carriers so that when the tubes arrive at the welding station, faulty action occurs or no welding takes place. It is the object of the present invention to overcome all these above-mentioned difficulties.

According to the present invention, a pivoted electrode is employed for welding which is biased towards a central position in such a way that the tip of the electrode is permitted gently to wipe over the leading corner of the flattened tube which is to be welded and which is held in vice-like jaws. The biasing is preferably provided by a light spring although it may be effected by gravity. The vice-like jaws make electrical contact with the tube in the welding circuit, and to that end are preferably of copper. Once the arc has been started, the electrode assumes a central position which for convenience may be determined by a stop against which the electrode is returned by the light spring or by gravity. With this arrangement, it has been found possible to dispense with any complicated system of rotating electrodes, and the novel arrangement is considerably more effective in the case of both tin, lead and tin-coated lead tubes, and particularly lead tubes, than is an arrangement in which an electrode is mounted in a fixed and unyielding manner. Furthermore, owing to the slight wiping action which takes place at the tip of the electrode when first making contact with the tube at the beginning of the travel of the electrode, a selfcleaning action occurs, making it largely unnecessary to provide for any rotation of the electrode after dealing with each tube to present a fresh surface. The electrode is also of a simple construction and can be easily and quickly replaced. Its position in relation to the workpiece may be adjusted by mounting its pivot on an eccentric which permits the tip of the electrode to be adjusted with respect to the end of the tube quickly with micrometric accuracy merely by turning a handle fixed to the eccentric. The most satisfactory material for the electrode has been found to be copper which is superior for the present purpose to carbon.

In order to secure absolute uniformity of the distance the tube projects from the copper clamping jaws, a device is provided which, before the jaws close, brings the cut collapsible tube against a positioning stop which may be carried on an insulating bar on the carriage of the welding head, whereupon the clamping jaws close and the tube is thus positively set in a predetermined position. This is preferably effected by a lever system operated by a cam on a main cam shaft of the machine so that the tube is pushed against the stop while excessive pressure is prevented by the interposition of a light spring between a sliding member which actually displaces the tube and the member connected to the lever system. It will be appreciated that it is most convenient for the tube and the electrode to be substantially vertical so that the tube is actually lifted into contact with the said stop. The spring mechanism, while lifting the tube to the correct and predetermined height, also prevents damage to the cut tip of the tube such as might occur due to bending over of the tip of the tube.

In order to make possible the welding of lead tubes in a satisfactory manner, according to the invention, a small shield of nitrogen or other inert gas is established around the tip of the welding electrode and the end of the tube in such a manner that the arc and the melting of the metal of the tube occurs within this shield. Nitrogen has been found to be a suitable gas, but any other inert gas which does not react with the metal of the tube may be used, whereas in attempting to weld in an ordinary atmosphere, oxidation of the end of the tube will occur owing to the reaction between the oxygen of the atmosphere and the lead of the tube producing lead oxide, and imperfect welds would result. When using a gas shield of nitrogen or other inert gas, no oxidation occurs and no reaction between the gas and the metal of the tube takes place so that bright metal substantially free from oxide and imperfections results.

It is found desirable, in order to initiate the striking of the arc, to inject into the welding circuit a high voltage, high frequency current which at the moment of starting the arc, provides the necessary ionization which procedure is not, of course, new in itself. This current may be derived from any suitable source and may be generated by means of a spark coil and interruptor, or by means of a back-coupled thermionic valve circuit and so forth.

When welding lead tubes in particular, it has been found to be very necessary to maintain a stable arc, and consequently the use of alternating current for welding owing to its fluctuations is not very satisfactory. A source of current consisting of a storage cell battery, constant voltage direct current generator or other source giving a particularly smooth output has been found to be particularly suitable, and it is also found desirable to connect the tube vice and hence the tube itself to the positive side of the source, and the welding electrode to the negative side, in order to obtain a satisfactory arc and satisfactory welds. A series resistance is desirable both to adjust the welding current and in view of the negative resistance characteristic of the arc.

After the weld has been completed, the joint can be improved by removing the tube from the welding zone and subjecting the joint to vigorous squeezing, for example, by means of a pair of flat jaws which are closed on to the end of the tube where the joint has been made.

If it is found that after a certain amount of welding, it is desirable to employ fresh surfaces of the welding electrode, this may be effected by moving the welding electrode or the tube-clamping jaws slightly in a direction at right-angles to the travel during welding. This may be effected by gearing from a slow-moving part of the machine, or by a synchronously-driven electric clock. It is found, however, that when the injection of high frequency current into the welding circuit as mentioned above is adopted, this intermittent transverse movement of the electrode or clamping jaws is not usually necessary, and a slight transverse movement by hand during the initial setting up of the machine to find the best part of the electrode surface is all that is required. The electrode can then be run satisfactorily for several hours before requiring any further adjustment.

In order that the invention may be clearly understood and readily carried into effect, an example of the novel mechanism will now be described in connection with a machine having the same general lay-out as known machines in which collapsible tubes have been closed by folding over the edges at the end or by crimping the edges, or both; the machine is illustrated by way of example in the accompanying drawings, in which.

Figure 2:
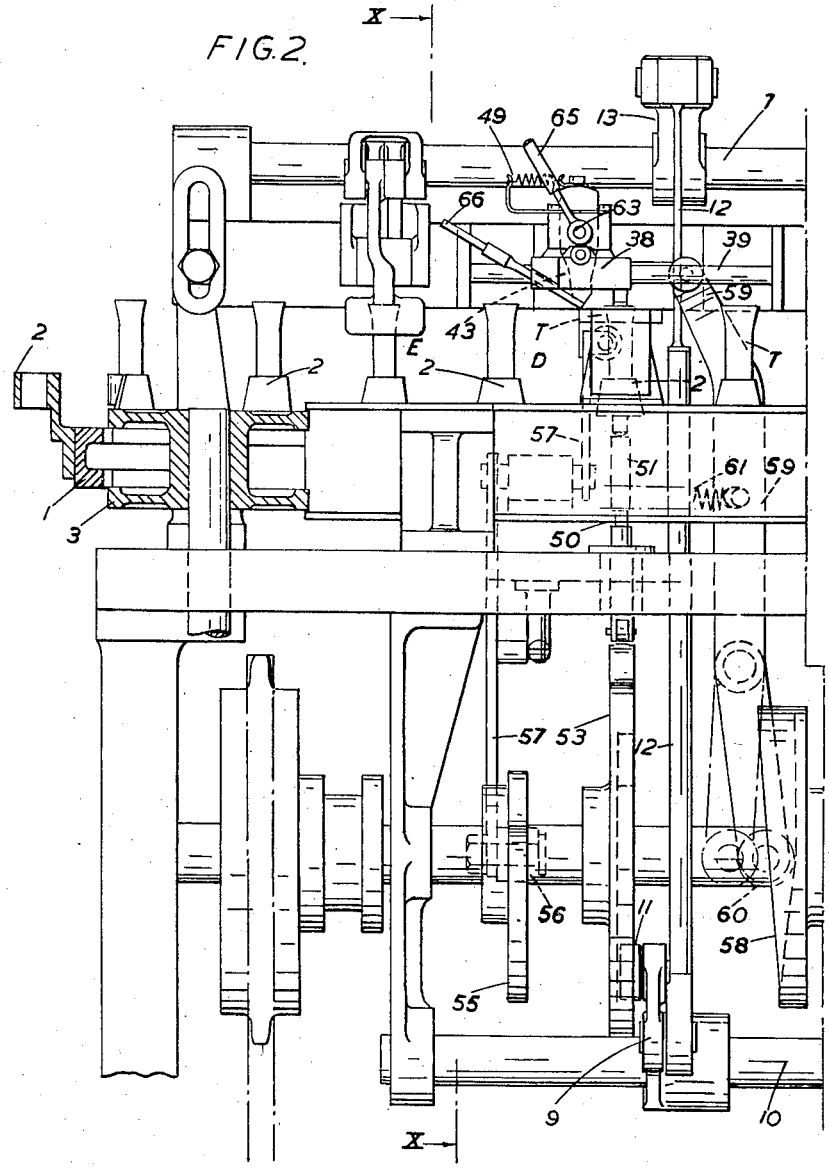
Figure 2 is a front elevation of the left-hand part of the machine.
Figure 3:
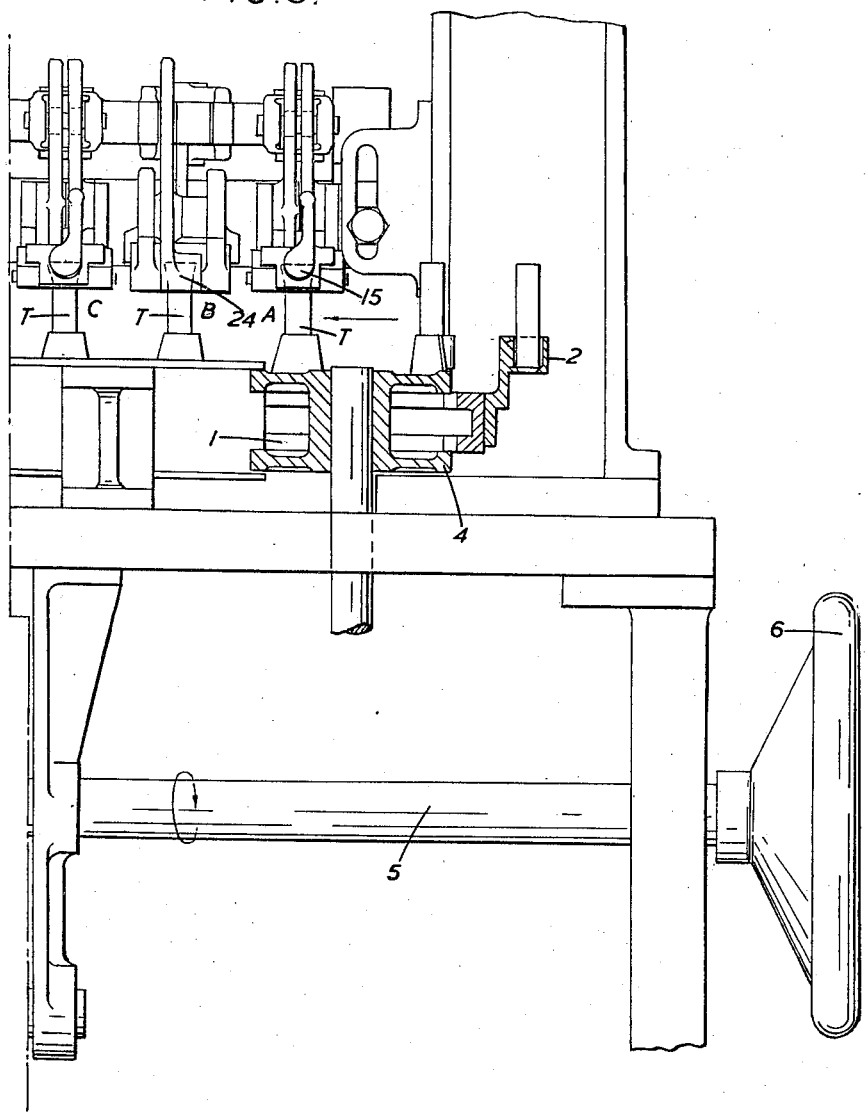

Figure 3, which is a continuation of Figure 2, is a similar view of the right-hand part of the machine.

Figure 4:
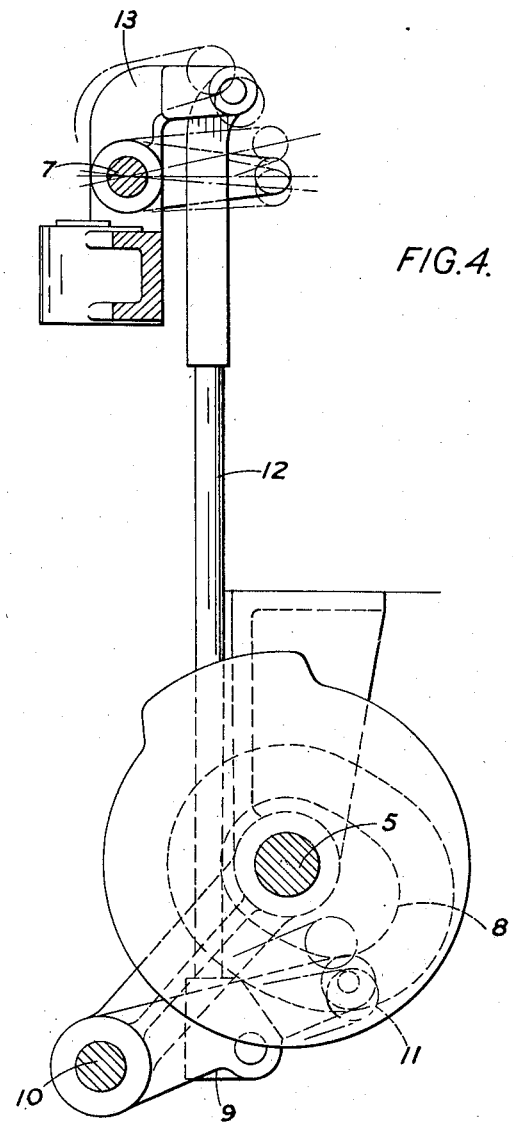

Figure 4 is an end elevation showing the disposition of the main cam shaft and of a rocking shaft at the back of the machine and the connection between them;

Figure 5 is a side elevation partly in section of a mechanism for forming the end of the tube into fish-tail form;

Figure 6 and Figure 7 are similar views of a mechanism for cutting off the end of the tube, Figure 6 showing the jaws of the mechanism open, and Figure 7 showing the mechanism just after the tube has been cut.

Figure 10:
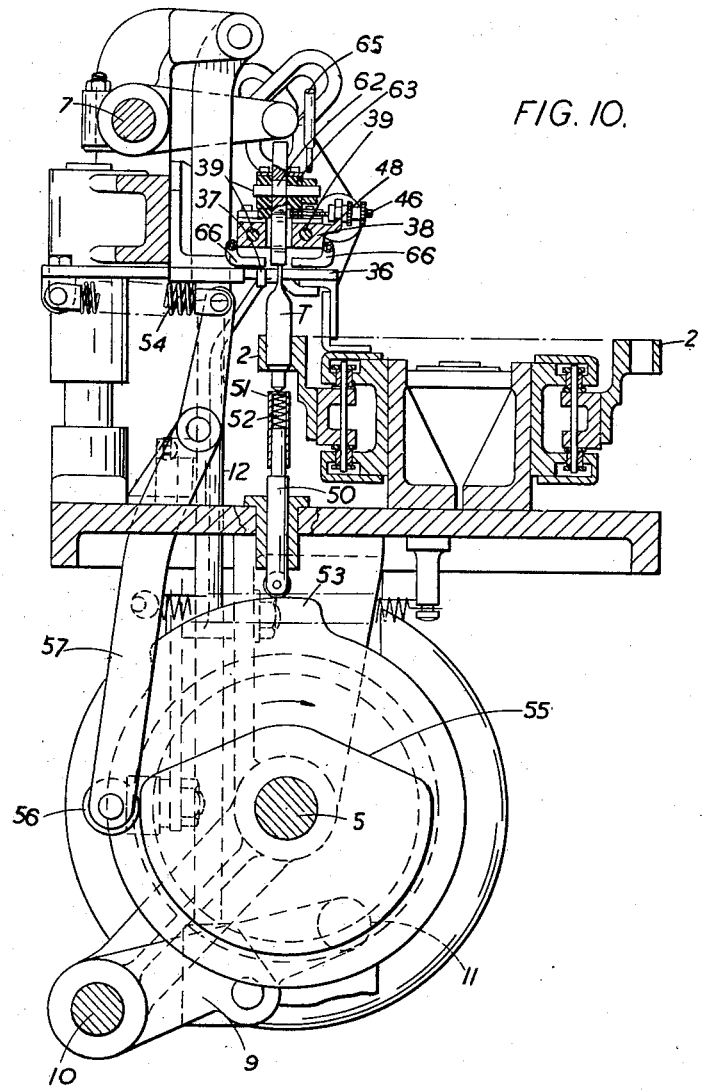

Figure 8 is a perspective view of a detail of this mechanism;

Figure 9 is a detail of the jaws of a squeezing mechanism similar to that shown in Figure 5;

Figure 10 is a side elevation of the welding head and associated mechanism, shown partly in section on the line X—X in Figure 2;

Figure 11 is a front elevation to an enlarged scale showing the welding head and associated mechanism;

Figure 12 is a plan of the same; and

Figure 13 is a cross-section on the line XIII—XIII in Figure 12.

Figure 14 is a side elevation of the mechanism for the final squeezing of the joint after welding; while Figures 15 and 16 are two circuit diagrams showing alternative methods of providing for the injection of high frequency current to facilitate striking the arc.

Figure 1:
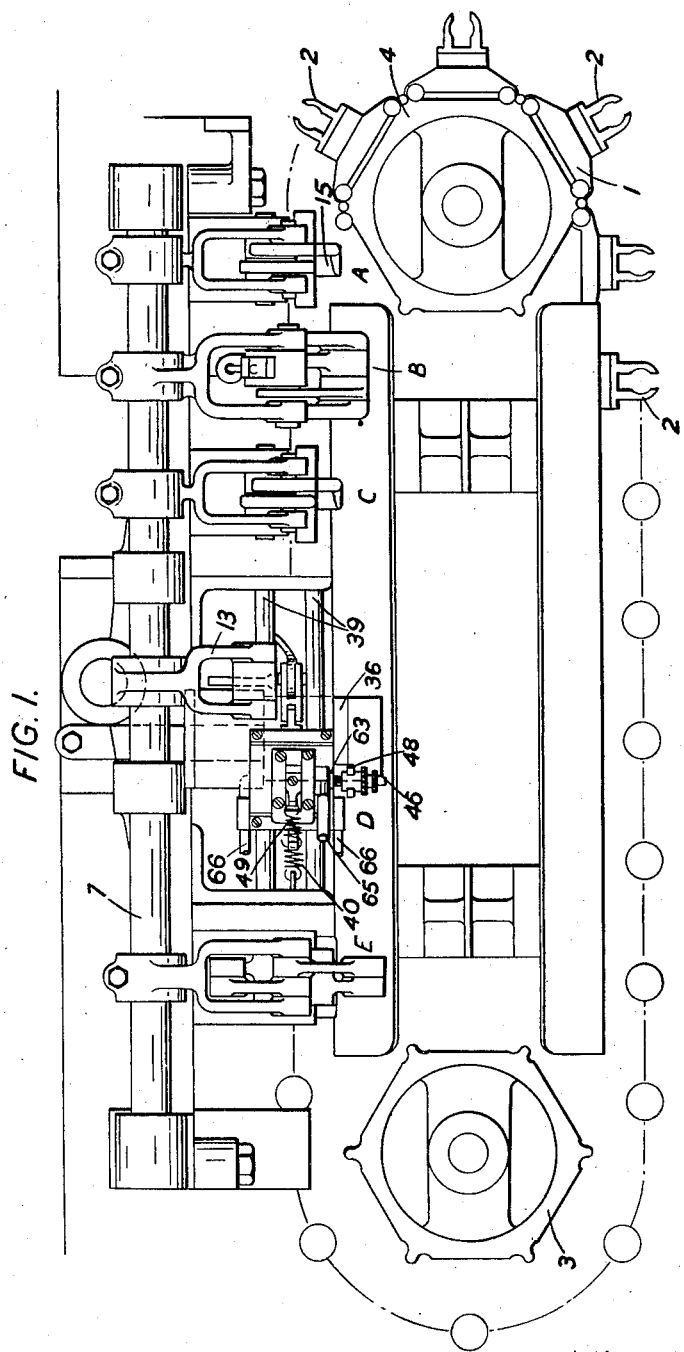
Figure 1 is a plan view showing the essential parts of the machine.

Referring first of all to Figures 1 to 3, the machine comprises a linked chain 1, each link of which carries a tube carrier 2 in which the tubes are placed by the operator at the front of the machine, as seen in Figure 1. The chain 1 is driven in step-by-step fashion by a pair of hexagonal sprockets 3, 4, the intermittent movement being effected by a Geneva stop mechanism, not shown in the drawings, but which is of an ordinary kind and has been used in machines for filling collapsible tubes. The tubes, therefore, are caused to pause at each station in the machine in order that the various operations may be carried out upon them.

These operations are effected through the intermediary of a power-driven main cam shaft 5 which also appears in Figure 4 and which is provided with a hand wheel 6, by means of which the machine may be slowly turned for setting up purposes. The machine also has at the back of the upper part a longitudinal shaft 7 which is rocked from the main cam shaft 5 through a mechanism clearly seen in Figures 2 and 4. The rocking of this shaft through the angle indicated in Figure 4 is produced by a mechanism which includes a cam 8 on the main cam shaft 5 which rocks an arm 9 pivoted at 10 and bearing a cam roller 11. This arm is connected to a connecting rod 12 which, at its upper end, is jointed to an arm 13 keyed to the back shaft 7. Thus, as the shaft 5 and cam rotate, the arm 13 and the shaft 7 are rocked through a certain angle in one direction and back again.

At the first station, the tubes dwell below a filling nozzle where they are filled with the required amount of material, such as shaving cream, dental paste, anti-gas ointment, and so forth. The mechanism used for this is that employed generally in filling machines and is not illustrated in the drawings. When the tube is filled, it is subjected to seven further operations which are carried out at the stations indicated generally by the letters A, B, C, D and E. At the station A, the end of the tube is closed, leaving the end of the tube with a fish-tail form. At the station B, a small part of the end of the tube is cut off to provide a clean freshly-cut end in a satisfactory state for effecting the welding operation. The third operation, carried out at the station C, is to free the tube from any slight rucks or folds, and to make it perfectly square by means of clamping jaws. The fourth, fifth and sixth operations, which are carried out at station D, consist in lifting the tube so that its cut end is raised into contact with a fixed stop, gripping it between vice jaws and carrying out the welding of the seam. Finally, the seventh operation, carried out at the station E, is the final squeezing or compacting of the joint.

The operation carried out at the station A can readily be appreciated from a study of Figure 5. A pair of clamping jaws 14, 15 are pivoted at 16 and are extended backwardly where they are formed with slots of the respective shapes shown at 17, 18. These jaws are operated by an arm 19 fixed to the shaft 7 and carrying a pin 20 which engages in both of the slots 17 and 18. Clearly, when the shaft 7 rocks to lift the arm 19, the jaws 14 and 15 are rocked and opened by the action of the pin 20 in the slots 17 and 18. In that condition, the tube T is brought between the jaws, as shown in Figure 5. The shaft 7 then rocks in the opposite direction, bringing down the arm 19 and firmly closing the jaws 14, 15 against opposite sides of the end of the tube T. It will be noted that the face plates 21, 22 of the jaws 14, 15 are inclined and form the end of the tube accordingly as seen in Figure 5 while the end of the tube is given a fish-tail form as seen at right angles to Figure 5 and indicated in certain of the other figures of the drawings.

From this point, the tube T goes to the station B at which the end is cut off. The mechanism for effecting this is illustrated in Figures 6 to 8. In this case, a pair of jaws 23, 24 are pivoted at 25. The jaw 24 is extended backwardly and slotted as shown at 26. The slot 26 is engaged by a pin 27 carried by an arm 28 also secured to the shaft 7. In Figure 6, the mechanism is shown with the arm 28 raised and the pin 27 at the top of the slot 26 so that the jaws 23, 24 are opened, which is the position adopted when the tube T is brought to this station.

As the pin 27 moves downwards in the slot 26 towards the position shown in Figure 7, a fairly large closing movement of the jaw 24 takes place and a small amount of closing movement of the jaw 23 owing to the fact that the jaw 23 turns about the pivot 25, and as the pin 27 moves down in the slot 26, a short arm 29 compresses a spring 30 coiled about a rod 31 and presses upon the tail 32 of the jaw 23. The two jaws 23 and 24, therefore, grip the end of the tube as indicated in Figure 7. The pin 27, however, continues to move down the slot 26 after the jaws have closed, thus increasing the pressure on the spring 30 and in turn pushing down the member 131 which carries the shear blade 132. The lower end of the member 131 and the shear blade 132 are shown in greater detail in Figure 8. The lower end of the shear blade comes into contact with the inclined surface 33 of the jaw 23 and is pushed down this surface and shears off a portion of the end of the tube, which operation has just been completed when the mechanism reaches the position shown in Figure 7. The mechanism shown keeps the shear blade 132 firmly pressed against the sloping surface 33 of the jaw 23 during the travel.

The tube is now moved to station C where its end is made square and flat by lightly pressing between two plates carried on a lever system similar to that used at station A and shown in Figure 5. The ends of the jaws and the two plates 34, 35 are shown in Figure 9, but the rest of the mechanism is not illustrated because it is precisely the same as that illustrated in Figure 5.

The tube is now moved to station D at which it is first moved upwards to a standard position and then the welding proper takes place. The tube T arrives in a position between a fixed jaw 36 and a sliding jaw 37 (Figures 10 to 13), which at this time are separated. The welding head 38 is arranged to move from left to right, as seen in Figure 11, on slide rods 39 under cam action against the pull of a tension spring 40. The welding head 38 has fixed to it a positive height stop 41 insulated by a block 42. The welding electrode 43 is pivoted at 44 in a slide 45 which runs in V guides on the top of the welding head 38 and the slide 45 can be operated by a screw 46 which has collars 47 on either side of a lug 48 integral with the welding head 38. By turning the screw 46, therefore, the slide or carriage 45 can be moved transversely so as to adjust the tip of the welding electrode 43 so that any desired part of it can be made to co-act with the end of the tube T, as seen in Figure 13. The welding head 38 is cut away to allow the welding electrode 43 a certain amount of swinging motion in either direction about its pivot 44, but normally the electrode 43 is held in the vertical position shown in Figure 11 by means of a light spring 49. In that position, a stop 43a consisting of a small piece of insulating material screwed into the rear face of the electrode 43 is held in contact with the cut away part of the welding head 38.

At this stage, the welding head is to the left, as shown in Figure 11, so that the positive height stop 41 is centrally disposed above the tube T.

While the jaws 36, 37 are still opened, the tube T is lifted into contact with the stop 41. This is effected by a plunger 50 which has a tubular tappet head 51 with a light spring 52 between it and the plunger 50. At this stage, the plunger 50 is lifted by a cam 53 on the main cam shaft 5. In this way, the freshly cut upper end of the tube T is brought to the standard height in contact with the stop 41 and the interposition of the light spring 52 prevents any burring or other damage to the tip of the tube T. The movable jaw 37 is now allowed to move to the right in Figure 10 by the action of a spring 54 which is permitted by the fact that a cam 55 on the main cam shaft 5 pushes a roller 56 on the clamping jaw operating lever 57 to the left in Figure 10. The next step is for the welding head 38 to be moved to the right in Figure 11. This is effected by means of a cam 58 (Figure 2) which operates the welding head lever 59. The latter carries a roller 60 held up to the cam 58 by a spring 61. Thus, the lever 59 draws the welding head 38 to the right in Figures 2 and 11 against the pull of the spring 40. The tip of the electrode 43 thus meets the leading corner of the tube T projecting from the clamping jaws 36, 37, and thereupon the electrode 43 is momentarily tilted slightly into the position shown in chain lines in Figure 11 against the pull of the light spring 49.

Just before the tip of the electrode 43 touches the corner of the tube T, the arc is initiated by the high voltage high frequency current injected into the welding circuit, as will be described more fully later, and the arc becomes a direct current metallic vapour arc melting down the projecting portion of the tube T in advance of the electrode 43, as the latter moves along over the jaws 36, 37, and so produces the welded joint. Thus the electrode 43 is brought back into the vertical position soon after the initial tilting and travels over the end of the tube T while taking up the vertical position.

As has been already mentioned, the welding electrode 43 is mounted on an eccentric 62 on a spindle 63, and this spindle is mounted in insulating plates 64 so that the electrode 43 is insulated from the welding head. As will be explained later, this electrode is connected to the negative side of the direct current source of welding supply, and the positive side is connected to the jaws 36, 37 and thence to the tube T. The height of the electrode can be adjusted with microme-tric accuracy by rotating the spindle 63 and the eccentric 62 by means of a hand lever 65. It has been found that the best height for the tube T to project above the copper jaws 36, 37, lies between 0.015 and 0.05 of an inch, the best results being obtained when projecting from 0.025 to 0.035 of an inch above the top surface of the jaws 36, 37. The most satisfactory material for the electrode 43 is found to be copper, which is superior in this arrangement to carbon.

It has already been indicated that it is desirable to effect the welding in a small shield of nitrogen or other inert gas. This is supplied to the welding zone through a pair of tubes 66. The nitrogen may be supplied from a cylinder fitted with a suitable pressure-reducing valve, and it is convenient to provide a flow gauge to enable the rate of flow of the nitrogen to be observed and regulated. Although the arrangement with the tubes directed one from each side on to the tip of the electrode 43 as shown is found to be effective, other methods of supplying the nitrogen may be employed such as by means of tubes directed along the direction of travel or through passages made in the electrode 43 itself.

After the welded joint has thus been made, the clamping jaws 36, 37 are opened by means of the cam 55 and the tube T is passed on to the station E, where the final pressing or squeezing is effected, and the cam 58 allows the spring 40 to draw the welding head 38 to the left in Figures 2 and 11 so that the whole cycle may be repeated on the next tube. At the pressing station E, the welded joint is squeezed to approximately the same thickness as the original combined thickness of the tube walls. This is effected by the mechanism shown in Figure 14. A lever 67 fixed to the shaft 7 is pivoted to a pair of toggle links 68 which in turn are pivoted to jaws 69, 70, pivoted to a bracket respectively at 71, 72. When the arm 67 descends, the links 68 are spread and close the jaws 69, 70, which press the tube T as shown in Figure 14. The tube is then ejected from the machine.

Two suitable forms of electrical circuit for use in the machine are shown in Figures 15 and 16. In each case, the source of welding current shown is a battery 73 which provides a voltage of about 50 volts. As already stated, the positive side of the battery is connected to the clamping jaws 36, 37, and the negative side of the battery 73 is connected to the welding electrode 43. A series resistance 74 is provided to regulate the welding current and to compensate for the negative resistance characteristic of the arc. The welding current is indicated on an ammeter 75 and it has been found that good results can be obtained in welding the end of a collapsible tube of lead of a half inch in diameter and 0.006 of an inch thick when using a welding current of from 2 to 3 amperes. A volt meter 76 is provided to show the voltage across the arc.

In Figure 15, the high voltage, high frequency current which is injected into the welding circuit during the whole of the time of welding, is produced by a spark coil 77 fed from a source of alternating current supply 78. The winding of the coil 77 is in series with an interruptor 79 which, as shown, is magnetically operated by the core of the coil 77 although, of course, any other suitable type of mechanically driven interruptor might be used. The high frequency output provided by interrupting the circuit of the coil 79 is supplied to the primary winding 80 of a high frequency transformer and the output circuit is tuned by a pair of condensers 81. The secondary winding 82 of the high frequency transformer is connected directly in the welding circuit. In this way, a potential of several thousand volts at a radio frequency having a wide range may be produced. The frequency may lie within a range from several hundred thousand cycles to several megacycles per second. The supply 78 may, for example, be of a frequency of 50 at, say, 230 volts. The high potential end of the secondary winding 82 is connected to the welding electrode 43.

In Figure 16 a thermionic valve generator is shown fed with raw alternating current from the source 78 through a main transformer 83. The plate supply for the thermionic valve 84 is obtained from a high voltage secondary winding 85, and the filament supply from a low voltage secondary winding 86. The winding 85 is bridged by a reservoir condenser 87, and the high tension supply is fed through a high frequency choke coil 88 and through a milli-ammeter 89 to a tapping point 90 in the primary winding 80 of the high frequency transformer which is found to be the best point by experiment. The oscillatory circuit for the high frequency current is completed by a condenser 91. Sustained oscillations are set up by connecting this circuit to the grid of the valve 84, through a condenser 92. The grid potential is adjusted by connecting the grid to the filament through a high frequency choke coil 93, a grid leak resistance 94, and an automatic grid bias resistance 95, to the centre point of the secondary winding 86 which supplies the filament of the valve 84. The high voltage circuit is also completed by connecting the condenser 87 to the mid-tapping of the secondary winding 86. By-pass condensers 96 are also provided. In this case, of course, the oscillations injected into the welding circuit are undamped. It may be necessary in some circumstances to tune the secondary winding 82 of the high frequency transformer by means of a small condenser.

I claim:

1. In an arc welding machine for welding together the flattened abutting edges of a collapsible metal tube, the combination of a clamp for holding the flattened tube, a pivoted welding electrode resiliently biased to a central position, said electrode being mounted to be tilted from said central position by engagement with the abutting edges of said tube, and means for effective relative movement between said tube and said electrode to cause the tip of said electrode to wipe over the leading corner of the end of said flattened tube.

2. In an arc welding machine for welding together the flattened abutting edges of a collapsible metal tube, the combination of a clamp for holding the flattened tube stationary during welding, a welding electrode pivoted about a horizontal axis at right angles to the end of said flattened tube, a stop for said electrode, a light spring attached to said electrode to bias the same into contact with said stop, said electrode being mounted to be tilted away from said stop by engagement with the abutting edges of said tube, a source of electrical supply connected to said tube and to said electrode and means for traversing said electrode along the end of said flattened tube to cause the tip of said electrode to wipe over the leading corner of the end of said flattened tube.

3. In an arc welding machine for welding together the flattened abutting edges of a collapsible metal tube, the combination of a clamp having electrically conducting vice jaws for holding the flattened tube, a pivoted copper welding electrode resiliently biased to a central position, said electrode being mounted to be tilted from said central position by engagement with the abutting edges of said tube, electrical supply terminals for said clamp and said electrode and means for effecting relative movement between said tube and said electrode to cause the tip of said electrode to wipe over the leading corner of the end of said flattened tube.

4. In an arc welding machine for welding together the flattened abutting edges of a collapsible metal tube, the combination of a clamp for holding the flattened tube, a pivoted welding electrode resiliently biased to a central position, the pivot of said welding electrode consisting of a rotatable eccentric, said electrode being mounted to be tilted from said central position by engagement with the abutting edges of said tube, and means for effecting relative movement between said tube and said electrode to cause the tip of said electrode to wipe over the leading corner of the end of said flattened tube.

5. In an arc welding machine for welding together the flattened abutting edges of a collapsible metal tube, the combination of a support for said tube, a positioning stop for said tube, means for setting said tube by resiliently contacting the edges of said tube with said stop, a clamp having a pair of vice jaws, means for closing said jaws on to the flattened walls of said tube after the setting of said tube, a welding electrode and means for moving said electrode and said tube relatively to each other to cause fusion and welding together of the abutting edges of said tube.

6. In an arc welding machine for welding together the flattened abutting edges of a collapsible metal tube, the combination of a support for holding said tube in a vertical position, a carriage slidable above the abutting edges of said tube, a positioning stop mounted on said carriage above said tube, means for setting said tube by resiliently moving said tube vertically to bring the edges thereof into contact with said stop, a clamp having a pair of vice jaws, means for closing said jaws on to the flattened walls of said tube after the setting of said tube, a welding electrode pivoted in said carriage and means for traversing said carriage over said tube to remove said stop therefrom and to move said electrode along the abutting edges of said tube to effect welding of same.

7. In an arc welding machine for welding together the flattened abutting edges of a collapsible metal tube, the combination of a conveyor, a plurality of tube supports each carried by said conveyor and each disposed to support a collapsible metal tube in a vertical position, means for driving said conveyor in step-by-step fashion to cause each of said supports to move into and dwell at a plurality of stations, means located at one of said stations for shaping the open ends of collapsible metal tubes brought to said station, a carriage mounted to slide above said conveyor parallel with the direction of movement of said conveyor at another of said stations, a positioning stop mounted on said carriage above said conveyor, means for setting each tube at said last-mentioned station by resiliently moving said tube vertically in its support to bring the edges of said tube into contact with said stop, a clamp having a pair of vice jaws, means for closing said jaws on to the flattened walls of said tube after the setting of said tube, a welding electrode pivoted in said carriage and means for traversing said carriage over said conveyor parallel with the direction of movement of said conveyor to remove said stop from the tube and to move said electrode along the abutting edges of said tube to effect welding of same.

8. In an arc welding machine for welding together the flattened abutting edges of a collapsible metal tube, the combination of a jointed link conveyor chain, a plurality of tube supports each carried by a link of said chain and each disposed to support a collapsible metal tube in a vertical position, means for driving said chain in step-by-step fashion to cause each of said supports to move into and dwell at a plurality of stations, a carriage mounted to slide above said chain parallel with the direction of movement of said chain at one of said stations, a positioning stop mounted on said carriage above said chain, means for setting each tube at said station by resiliently moving said tube vertically in its support to bring the edges of said tube into contact with said stop, a clamp having a pair of vice jaws, means for closing said jaws on to the flattened walls of said tube after the setting of said tube, a welding electrode pivoted in said carriage, means for traversing said carriage over said chain parallel with the direction of movement of said chain to remove said stop from the tube and to move said electrode along the abutting edges of said tube to effect welding of same, and means located at another of said stations for consolidating the welded joint and comprising a pair of flat vice jaws with means for closing said flat vice jaws on to the end of the tube for squeezing the welded joint.

9. In an arc welding machine for welding together the flattened abutting edges of a collapsible metal tube, the combination of a jointed link conveyor chain, a plurality of tube supports each carried by a link of said chain and each disposed to support a collapsible metal tube in a vertical position, means for driving said chain in step-by-step fashion to cause each of said supports to move into and dwell at a plurality of stations, means located at one of said stations for shaping the open ends of collapsible metal tubes brought to said station, means located at another of said stations for cutting off the ends of said collapsible metal tubes brought to said last-mentioned station to present fresh metal surfaces preparatory to welding, a carriage mounted to slide above said chain parallel with the direction of movement of said chain at yet another of said stations, a positioning stop mounted on said carriage above said chain, means for setting each tube at said last-mentioned station by resiliently moving said tube vertically in its support to bring the edges of said tube into contact with said stop, a clamp having a pair of vice jaws, means for closing said jaws on to the flattened walls of said tube after the setting of said tube, a welding electrode pivoted in said carriage and means for traversing said carriage over said chain parallel with the direction of movement of said chain to remove said stop from the tube and to move said electrode along the abutting edges of said tube to effect welding of same.

10. In an arc welding machine for welding together the flattened abutting edges of a collapsible metal tube, the combination of a jointed link conveyor chain, a plurality of tube supports each carried by a link of said chain and each disposed to support a collapsible metal tube in a vertical position, means for driving said chain in step-by-step fashion to cause each of said supports to move into and dwell at a plurality of stations, means located at one of said stations for flattening the open ends of collapsible metal tubes brought to said station, means located at a second of said stations for cutting off the ends of said collapsible metal tubes brought to said second station to present fresh metal surfaces in readiness for welding, means located at a third of said stations comprising flat jaws and means for closing said flat jaws on to the ends of said tubes to make said ends flat and square, a carriage mounted to slide above said chain parallel with the direction of movement of said chain at a fourth of said stations, a positioning stop mounted on said carriage above said chain, means for setting each tube at said last-mentioned station by resiliently moving said tube vertically in its support to bring the edges of said tube into contact with said stop, a clamp having a pair of vice jaws, means for closing said jaws on to the flattened walls of said tube after the setting of said tube, a welding electrode pivoted in said carriage and means for traversing said carriage over said chain parallel with the direction of movement of said chain to remove said stop from the tube and to move said electrode along the abutting edges of said tube to effect welding of same.

11. In an arc welding machine for welding together the flattened abutting edges of a collapsible metal tube, the combination of a support for holding said tube in a vertical position, a carriage slidable above the abutting edges of said tube, a positioning stop mounted on said carriage above said tube, a tappet mounted to move vertically below said support, a main actuating shaft, a setting cam thereon, resilient means actuated by said cam to raise said tappet to lift said tube vertically to bring the edges thereof into contact with said stop, a clamp having a pair of vice jaws, a clamp-closing cam on said main actuating shaft operatively connected and timed to close said jaws on to the flattened walls of said tube after the edges thereof have been brought into contact with said stop, a welding electrode pivoted in said carriage, a carriage-traversing cam on said main actuating shaft and a lever linked to said carriage and in operative relation with said cam to traverse said carriage over said tube to remove said stop therefrom and to move said electrode along the abutting edges of said tube to effect welding of same.

12. In an arm welding machine for welding together the flattened abutting edges of a collapsible metal tube, the combination of a support for holding said tube in a vertical position, a carriage slidable above the abutting edges of said tube, a positioning stop mounted on said carriage above said tube, means for setting said tube by resiliently moving said tube vertically to bring the edges thereof into contact with said stop, a clamp having a pair of vice jaws, means for closing said jaws on to the flattened walls of said tube after the setting of said tube, a welding electrode pivoted in said carriage, at least one conduit for a supply of inert gas mounted for movement with said carriage and having an outlet in the neighborhood of the tip of said electrode, and means for traversing said carriage over said tube to remove said stop therefrom and to move said electrode along the abutting edges of said tube to effect welding of same.

13. In an arc welding machine for welding together the flattened abutting edges of a collapsible metal tube, the combination of a support for holding said tube in a vertical position, a carriage slidable above the abutting edges of said tube, a positioning stop mounted on said carriage above said tube, means for setting said tube by resiliently moving said tube vertically to bring the edges thereof into contact with said stop, a clamp having a pair of vice jaws, means for closing said jaws on to the flattened walls of said tube after the setting of said tube, a slide mounted in said carriage to move transversely to the direction of movement of said carriage, a welding electrode pivoted in said slide and means for traversing said slide with said carriage over said tube to remove said stop therefrom and to move said electrode along the abutting edges of said tube to effect welding of same.

14. In an arc welding machine for welding together the flattened abutting edges of a collapsible metal tube, the combination of a support for holding said tube in a vertical position, a carriage slidable above the abutting edges of said tube, a positioning stop mounted on said carriage above said tube, means for setting said tube by resiliently moving said tube vertically to bring the edges thereof into contact with said stop, a clamp having a pair of vice jaws, means for closing said jaws on to the flattened walls of said tube after the setting of said tube, a slide mounted in said carriage to move transversely to the direction of movement of said carriage, a welding electrode pivoted in said slide, means for traversing said slide with said carriage over said tube to remove said stop therefrom and to move said electrode along the abutting edges of said tube to effect welding of same, and manual means for effecting transverse setting of said electrode by movement of said slide in said carriage.

WILLIAM JOSEPH RANDALL.